US010586275B2

(12) United States Patent
Richards et al.

(10) Patent No.: US 10,586,275 B2
(45) Date of Patent: *Mar. 10, 2020

(54) SYSTEM FOR USING MOBILE DEVICES FOR OUTPUTTING AUDIO DATA SETS AT A VENUE

(71) Applicant: AMI Entertainment Network, LLC, Trevose, PA (US)

(72) Inventors: Ronald Richards, Elmhurst, IL (US); Charles Jaros, Chicago, IL (US); Kapil Mistry, Schaumburg, IL (US)

(73) Assignee: AMI ENTERTAINMENT NETWORK, LLC, Trevose, PA (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/040,180

(22) Filed: Jul. 19, 2018

(65) Prior Publication Data

US 2018/0336624 A1    Nov. 22, 2018

Related U.S. Application Data

(63) Continuation of application No. 14/212,333, filed on Mar. 14, 2014, now Pat. No. 10,032,213.

(Continued)

(51) Int. Cl.
G06Q 30/00 (2012.01)
G06Q 30/06 (2012.01)

(52) U.S. Cl.
CPC ............................. G06Q 30/0641 (2013.01)

(58) Field of Classification Search
CPC .................................................. G06Q 30/0641

(Continued)

(56) References Cited

U.S. PATENT DOCUMENTS

| 4,667,802 A | 5/1987 | Verduin et al. |
| 8,484,099 B1 | 7/2013 | Pope et al. |

(Continued)

OTHER PUBLICATIONS

What a juke! A collaborative music sharing system, Zhaofei Chen, Emre A. Yavuz, Gunnar Karlsson Laboratory for Communication Networks Linnaeus Center ACCESS, KTH, Stockholm, Sweden (Year: 2012).*

*Primary Examiner* — Jeffrey A. Smith
*Assistant Examiner* — Lalith M Duraisamygurusamy
(74) *Attorney, Agent, or Firm* — Panitch Schwarze Belisario & Nadel LLP

(57) ABSTRACT

A system is provided to output audio data sets at a venue. The system includes an audio catalog that stores a plurality of audio data sets available for display at the venue and which is remotely located from the venue. The system also includes a server system in electronic communication with the audio catalog and remotely located from the venue. The server system receives association requests from mobile devices of users which are used to associate the respective mobile devices with the venue. The venue has one or more venue controllers communicatively coupled to the server system. The mobile devices are remotely located from the server system. The server system transmits a listing of the plurality of audio data sets to the associated mobile devices and receives selections of one or more of the plurality of audio data sets to be played at the venue. The server system then transmits the selected one or more audio data sets to a respective network interface of at least one of the one or more venue controllers which cause the one or more audio data sets to be played on one or more audio output devices deployed at the venue.

9 Claims, 6 Drawing Sheets

Related U.S. Application Data

(60) Provisional application No. 61/784,275, filed on Mar. 14, 2013.

(58) Field of Classification Search
USPC .................................................... 705/27.1
See application file for complete search history.

(56) References Cited

U.S. PATENT DOCUMENTS

| | | | |
|---|---|---|---|
| 9,361,633 B1* | 6/2016 | Thiagarajan | G06Q 30/0224 |
| 2004/0023665 A1 | 2/2004 | Simmonds et al. | |
| 2006/0153020 A1 | 7/2006 | Johnson et al. | |
| 2008/0239887 A1* | 10/2008 | Tooker | G07F 17/00 |
| | | | 369/30.06 |
| 2010/0306547 A1 | 12/2010 | Fallows et al. | |
| 2012/0071238 A1 | 3/2012 | Bala et al. | |
| 2012/0310971 A1 | 12/2012 | Tran | |
| 2012/0324515 A1* | 12/2012 | Dashevskiy | H04N 21/4222 |
| | | | 725/78 |

\* cited by examiner

SYSTEM FOR USING MOBILE DEVICES FOR OUTPUTTING AUDIO DATA SETS AT A VENUE

CROSS-REFERENCE TO RELATED APPLICATIONS

This application is a continuation of copending U.S. application Ser. No. 14/212,333 filed on Mar. 14, 2014, the entire disclosure of which is incorporated by reference herein.

This application claims priority to U.S. Provisional Application No. 61/784,275, entitled "System and Method for Song to Video Initiation," filed on Mar. 14, 2013, the entire contents of which are incorporated by reference herein.

BACKGROUND OF THE INVENTION

An embodiment of the present invention relates to converting users' audio play selections to music video purchases, and more particularly, to jukeboxes with music video up-sell capabilities.

Jukeboxes having a plurality of songs available for selection and play are generally known. Jukeboxes typically operate upon input of currency and are installed in venues such as bars, restaurants, airports, shopping malls, video arcades, casinos or the like. Upon receipt of currency, a user is prompted to select one or more songs for play. Songs are played typically over a public speaker system installed in the venue of the jukebox. Originally, the music selections were provided on 45 rpm records that were played by an automated turntable in the jukebox. The vinyl records were eventually replaced by compact discs (CDs) and the turntable replaced by a CD player. More recently, jukeboxes have become computerized, capable of playing selections of music as MP3 files, streaming audio data sets, or the like.

In particular, jukeboxes are presently connected to networks and can receive digital audio files over Broadband connections, thereby reducing memory size requirements. Despite the network capabilities, current jukeboxes still have functional limitations that limit the information and experience that may be provided to a user. In particular, such jukeboxes are unable to up-sell video files corresponding to the selected audio files. This missed up-sell opportunity reduces per-venue and per-jukebox revenues.

It is desirable to provide a jukebox network that provides access to music video data to a plurality of jukeboxes, each of which may present offers to upgrade audio selections to video selections. It is further desirable to improve per-jukebox revenue by offering music video upgrades when such upgrades are available. It is also desirable to subscribe venues to music video subscription packages that allow patrons to select and/or purchase music video plays at a venue using mobile applications.

SUMMARY OF THE INVENTION

In one embodiment, a method of converting audio selections to video selections is described. An input of an audio selection is received from a user. A database of music videos is queried to determine whether a music video corresponding to the audio selection is available. The audio selection is output in response to determining that the database of music videos does not include the music video corresponding to the audio selection. An offer is presented to the user to upgrade the audio selection to the music video corresponding to the audio selection in response to determining that the database of music videos includes the music video corresponding to the audio selection. The music video is output to one or more displays in response to the user accepting the presented offer.

In another embodiment, a system for outputting music videos at a venue is described. The system includes a video catalog and a server system. The video catalog stores a plurality of video data sets available for display at the venue. The server system is configured to receive, over a first network, association requests from mobile devices of users. The association requests associate the respective mobile devices with the venue. The venue has one or more venue controllers communicatively coupled to the server system by a second network. The server system transmits, over the first network, a listing of the plurality of video data sets to the associated mobile devices, and receives selections of one or more of the plurality of video data sets to be played at the venue from at least one of the associated mobile devices. The server system transmits, over the second network, the selected one or more video data sets to at least one of the one or more venue controllers. The one or more venue controllers cause the transmitted one or more video data sets to be displayed on one or more display devices deployed at the venue.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

DETAILED DESCRIPTION OF THE PREFERRED EMBODIMENTS

Figure 1:
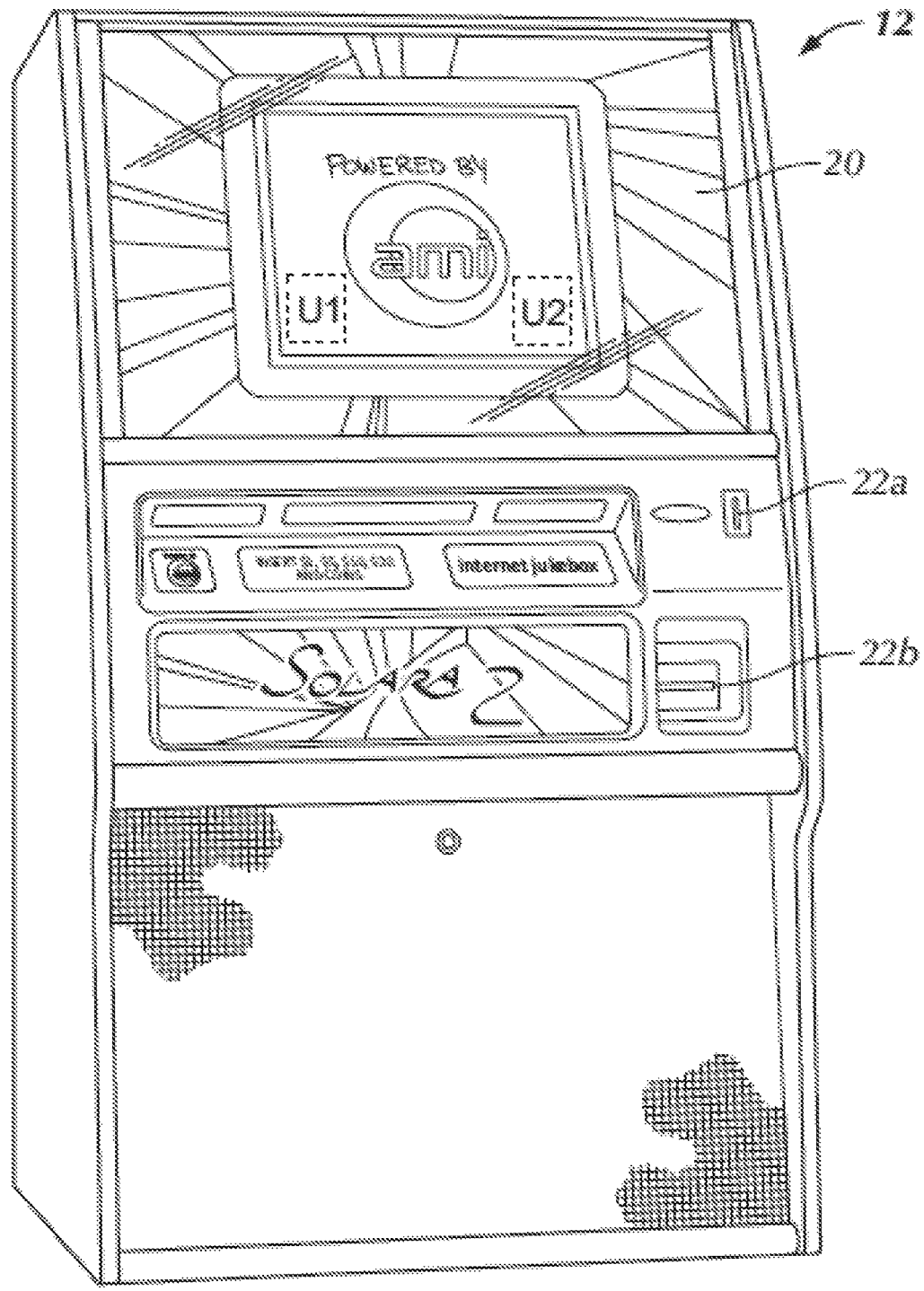
FIG. 1 is a perspective view of a jukebox device for use in accordance with preferred embodiments of the present invention.

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

Figure 2:
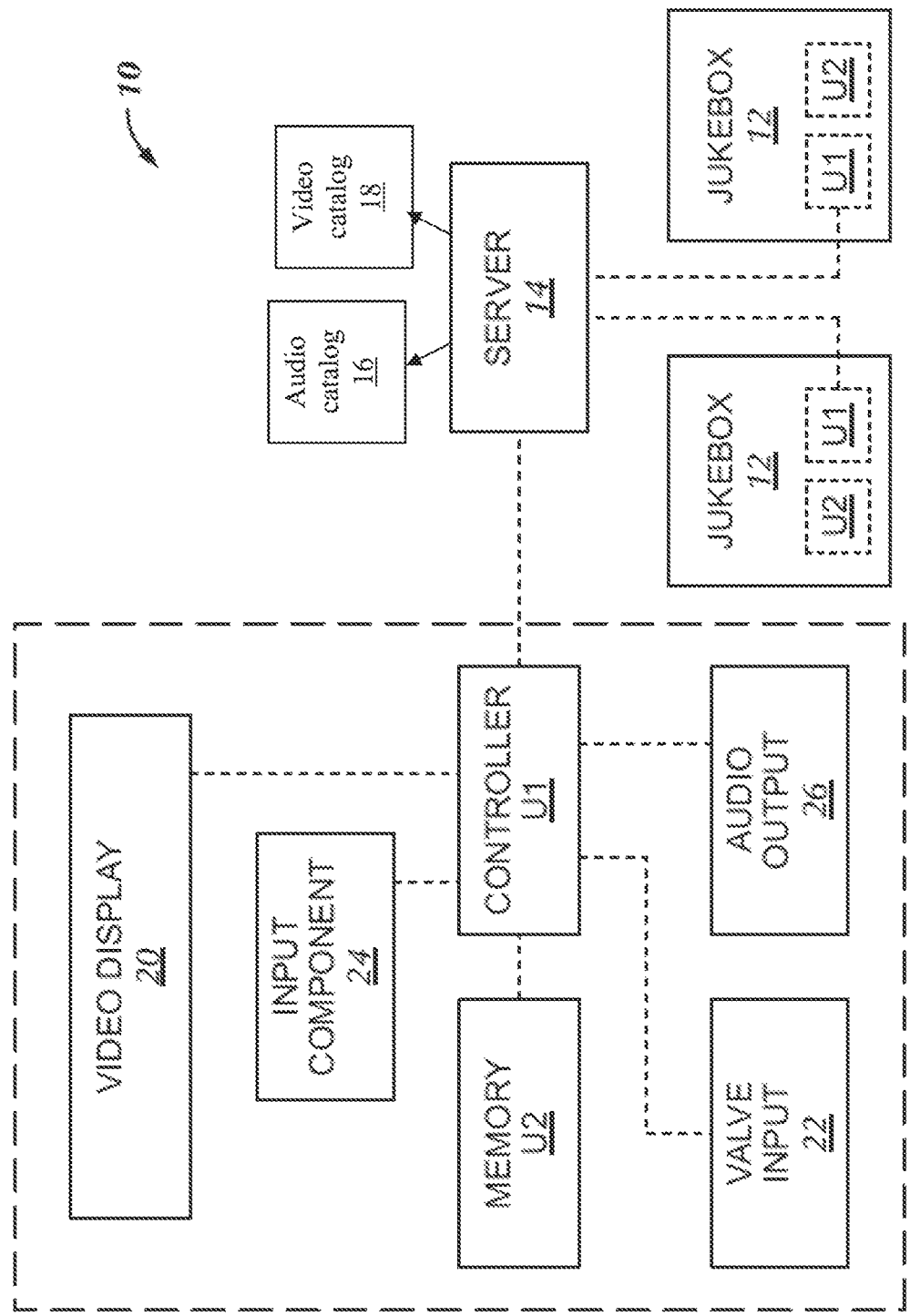
FIG. 2 is a schematic view of a jukebox network in accordance with preferred embodiments of the present invention.

Referring to the drawings in detail, wherein like reference numerals indicate like elements throughout, there is shown in FIGS. 1 and 2 a preferred embodiment of a jukebox device 12. The jukebox device 12 includes a controller U1 and a memory U2. The memory U2 can be any known or suitable memory device or combination of such devices such as random access memory (RAM), read only memory (ROM), flash RAM, hard disk, optical disk, or the like. The jukebox device 12 further includes a video display 20 that is operatively connected to the controller U1. Preferably, the video display 20 is a touchscreen video display configured to accept touch input. The jukebox device 12 shown in FIG. 1 is a free-standing or floor-standing apparatus, but may also be arranged in any configuration including table mount, wall mount, pole mount, and the like without departing from the invention.

The jukebox device 12 may also include at least one value input or value acceptor 22 that receives value in order to establish one or more credits. The value received may be at least one of currency, coins, tokens, chits, credits, credit cards/debit cards, or the like. FIG. 1 shows a coin acceptor 22a and a bill acceptor 22b as part of the jukebox device 12. In addition, value may also be received through input of a keypad or touchscreen of online account data, personal identification numbers (PINs), or the like, which may obviate the need for a value acceptor 22, although such methods are not mutually exclusive and may both be provided to provide a user 300 (FIG. 3) with a wide array of payment options. Preferably, the jukebox device 12 is made operable only upon receipt of value, for example, the user 300 may only select and play a song once value is received and/or one or more credits are established. However, free selections may be offered at the discretion of an operator of the jukebox device 12.

As shown in FIG. 2, an input component 24 is coupled to the controller U1. The input component 24 is preferably a touchscreen input from the display 20, but may also be one or more of a pushbutton(s), a track-ball or touchpad, a mouse, a joy-stick, a foot-pedal, a voice recognition system, a keypad or keyboard, and the like. Further, multiple input components 24 of the foregoing or other types may be provided on the jukebox device 12.

The jukebox device 12 also includes an audio output 26 coupled to the controller U1. The audio output 26 is preferably a digital amplifier with a multi-channel, pre-amplifier and one or more sockets for connection to one or more speakers or the like (not shown). Additionally, the audio output 26 may comprise one or more sockets for connection to an external audio amplification system (not shown), such as a stereo, wall-mounted speakers, surround sound system, or the like. The audio output 26 may also comprise one or more speakers internally housed by the jukebox device 12. Volume may be controlled by an external control, wireless remote, or an on-screen volume control manipulated via the touchscreen display 20.

FIG. 2 shows the jukebox device 12 as part of a network 10 having a plurality of additional jukebox devices 12 connected thereto. Each of the jukebox devices 12 is preferably in communication with a server system 14. The server system 14 is preferably one or more physical and/or virtual server devices, each having one or more processors, a network interface for interacting with external devices over a network such as the Internet, or the like, and one or more mass storage devices. Intermediate connections between the jukebox devices 12 and the server system 14, such as additional file servers, computers, other jukebox devices 12, or the like, may also be implemented. Functions of the server system 14 may be divided among a plurality of devices, such as in an N-tier server system, or the like. The controller U1 of the jukebox device 12 preferably communicates with the server system 14 over an Ethernet port, a wireless transceiver, or the like and may communicate with other devices or file servers, access the Internet, communicate over wide area networks (WANs) or local area networks (LANs), or the like. The jukebox device 12 preferably remains operable even if disconnected from the network 10.

Turning now to the operation of the jukebox device 12, the memory U2 may store a plurality of music data sets, a plurality of video data sets, and a system control program (e.g., an operating system). A music data set includes the audio data required for playing a song through the output component or audio output 26, and may be stored in any conventional format, such as an MP3 file, WAV file, or the like. Video data sets include multimedia data (i.e., video data and synchronized audio data) required for playing a music video through the output component or audio output 26 and the video display 20, or an external display device (not shown). Video data sets may be stored in any conventional file format, such as Audio Video Interleave (AVI), Flash Video, MPEG4, and the like.

Preferably, the music data set and the video data set each also include a plurality of identification values (also known as "metadata") corresponding to a respective plurality of identification categories. Examples of identification categories include a song title, an album title, an artist name, a genre of music, or the like. In the preferred embodiment, the metadata of the music data sets is cross-referenced with corresponding metadata of the video data sets. Thus, a video data set corresponding to a music data set can be automatically matched and/or identified.

Music data sets and/or video data sets may also be stored remotely, such as at the server 14, the audio catalog 16, the video catalog 18, or other remote file storage locations accessible by the controller U1. When retrieved remotely, a music data set and/or a video data set may be streamed to the controller U1 via a Broadband connection or the like. Alternatively, a music data set or a video data set may be downloaded by the jukebox device 12 from the memory U2, on instruction, onto the hard drive of the jukebox device 12. Preferably, the music data set or the video data set is downloaded in its entirety. The jukebox device 12 then plays the music data set or the video data set off of the jukebox hard drive. The music data set or the video data set is preferably provided serially to the memory U2 or a temporary memory of the controller U1, and the music data set or the video data set is played as packets thereof are being received. The music data set or the video data set does not necessarily remain in the jukebox device memory once it has been played. The music data set or the video data set is preferably buffered such that a minor interruption in the music data set or video data set download does not cause an interruption in the performance of the jukebox device 12.

The controller U1 is configured to retrieve for play, either from the memory U2 or from a remote location, such as the server 14, music data sets and video data sets selected by the user 300 from the plurality of stored music data sets and video data sets upon establishment of one or more credits. The controller U1 also controls the video display 20 based upon a system control program retrieved from the memory U2 and based upon inputs from the touchscreen or other input component 24. As used herein, the system control program refers to all of the software functions outside of the application program files including an operating system, display control, input control, sound drivers, and the like. When a video data set is selected for play, the controller U1 further controls the display 20 to output the video portion of the video data set, or causes the video portion to be output to an external display (e.g., high definition television, projector, or the like) through a video output interface such as HDMI or the like.

In the preferred embodiment, audio data sets and video data sets are selectable individually and independently of one another using various graphical user interfaces, as is well known to those skilled in the art. In order to improve revenue of jukeboxes 12, in response to receiving an audio data set selection, the controller U1 of the jukebox 12 is configured to search its hard drive and, optionally, one or more remote databases such as the video catalog 18 to identify a video data set corresponding to the audio data set selection. If the controller U1 identifies a corresponding video data set, the controller U1 outputs an offer on the display 20 to upgrade the audio selection to the corresponding video in exchange for additional value from the user 300. For example, if an audio costs two (2) play credits, an upgrade to video may cost one (1) additional play credit, for a total of three (3) play credits. Preferably, the offer to upgrade the audio selection to video is presented on a confirmation or checkout screen.

Referring to FIG. 2, the server 14 is communicably coupled to one or more audio catalogs 16 and one or more video catalogs 18. In one preferred embodiment, the audio catalogs 16 and the video catalogs 18 are distinct databases. However, the audio catalog 16 and the video catalog 18 may be implemented as one database without departing from the scope of this invention. In order to determine whether the offer should be presented, when an audio selection is made by a user 300, the server 14 compares the audio metadata stored in the audio catalog 16 to the video metadata stored in the video catalog 18 to determine whether a video data set corresponding to the audio data set selection is available in the video catalog 18.

As is known to those skilled in the art, often a song has multiple recorded versions and/or revisions, such as remixes, cover versions, acoustic versions, and the like. Therefore, the comparison of the audio catalog 16 to the video catalog 18 to identify a corresponding video preferably takes into account not only the artist name and song title of the selected audio data set, but also, the particular version or mix of the audio data set selected by the user 300 in the case where there are multiple versions of the selected audio. Preferably, if a video corresponding to the selected version or mix of the audio is not identified, an offer to upgrade to the video is not presented to the user 300. Thus, for example, if the user 300 selects the acoustic version of the song EVERLONG by the band the FOO FIGHTERS, but only the regular video for the song is available, the upgrade offer will not be presented to the selecting user 300.

Figure 3:
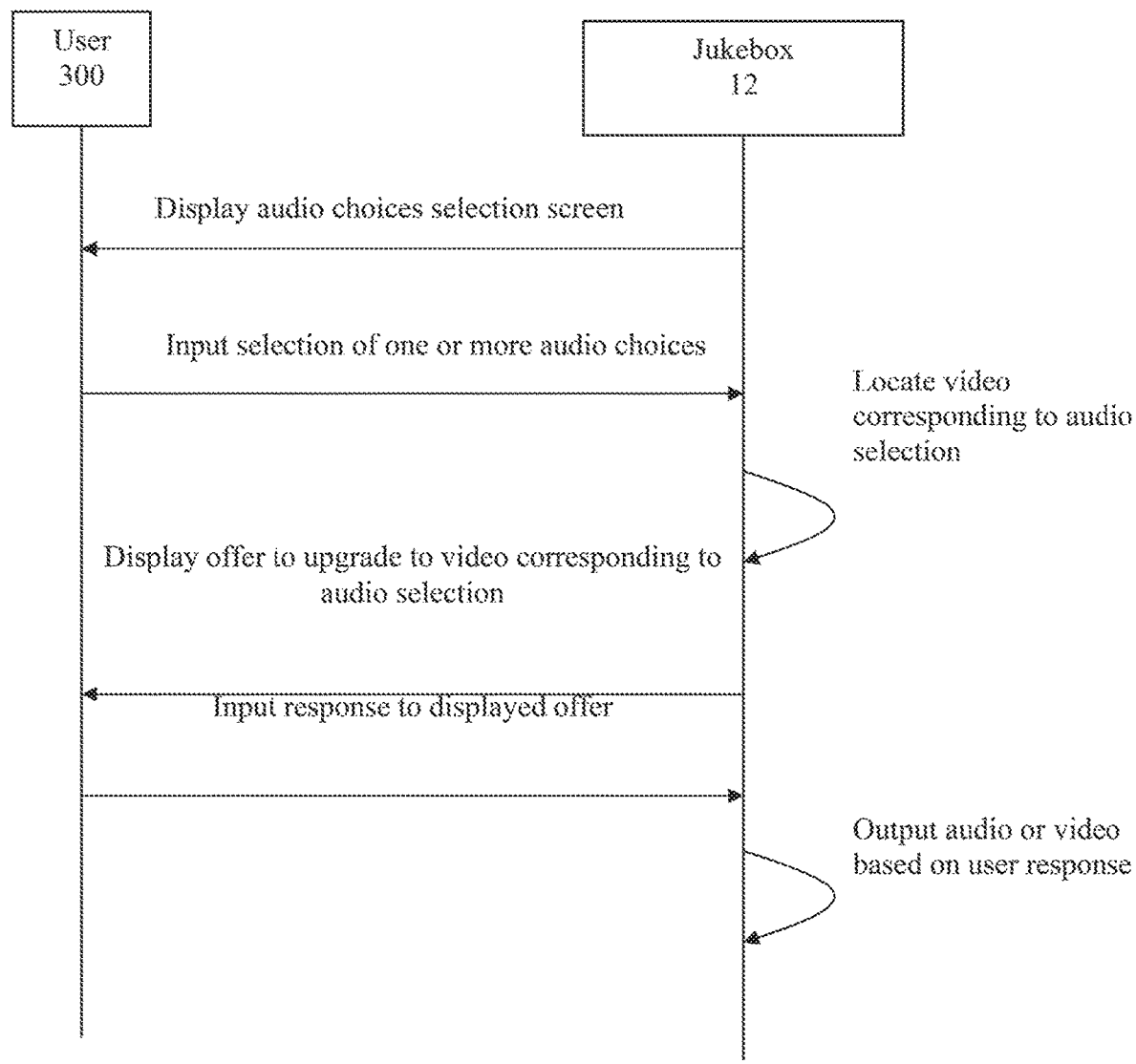
FIG. 3 is a sequence diagram of interactions between a user and a jukebox for offering a video file corresponding to a selected audio file in accordance with preferred embodiments of the present invention.

FIG. 3 is a sequence diagram of interactions between a user 300 and a jukebox 12 for presenting the user 300 with a video upgrade offer. The jukebox 12 displays an audio choices selection screen to the user 300. The user 300 inputs a selection of one or more audio choices from the displayed audio choices selection screen using the input component 24. The controller U1 of the jukebox 12 searches its hard drive to determine whether a video corresponding to the audio selection is present thereon. If a corresponding video selection is found, the jukebox 12 outputs an offer to upgrade the audio selection to the corresponding video for additional value. The user 300 selects whether to accept or to reject the offer using the input component 24. The jukebox 12 plays either the video or the audio based on the user's 300 selection. If the user accepts the offer to play the corresponding video, the controller U1 of the jukebox 12 charges the user 300 the additional value associated with playing the video. If the user 300 rejects the offer to play the video, makes no additional input, or if no video corresponding to the selected audio is found, the controller U1 retrieves for play, either from the memory U2 or from a remote location the selected audio data set.

Figure 4:
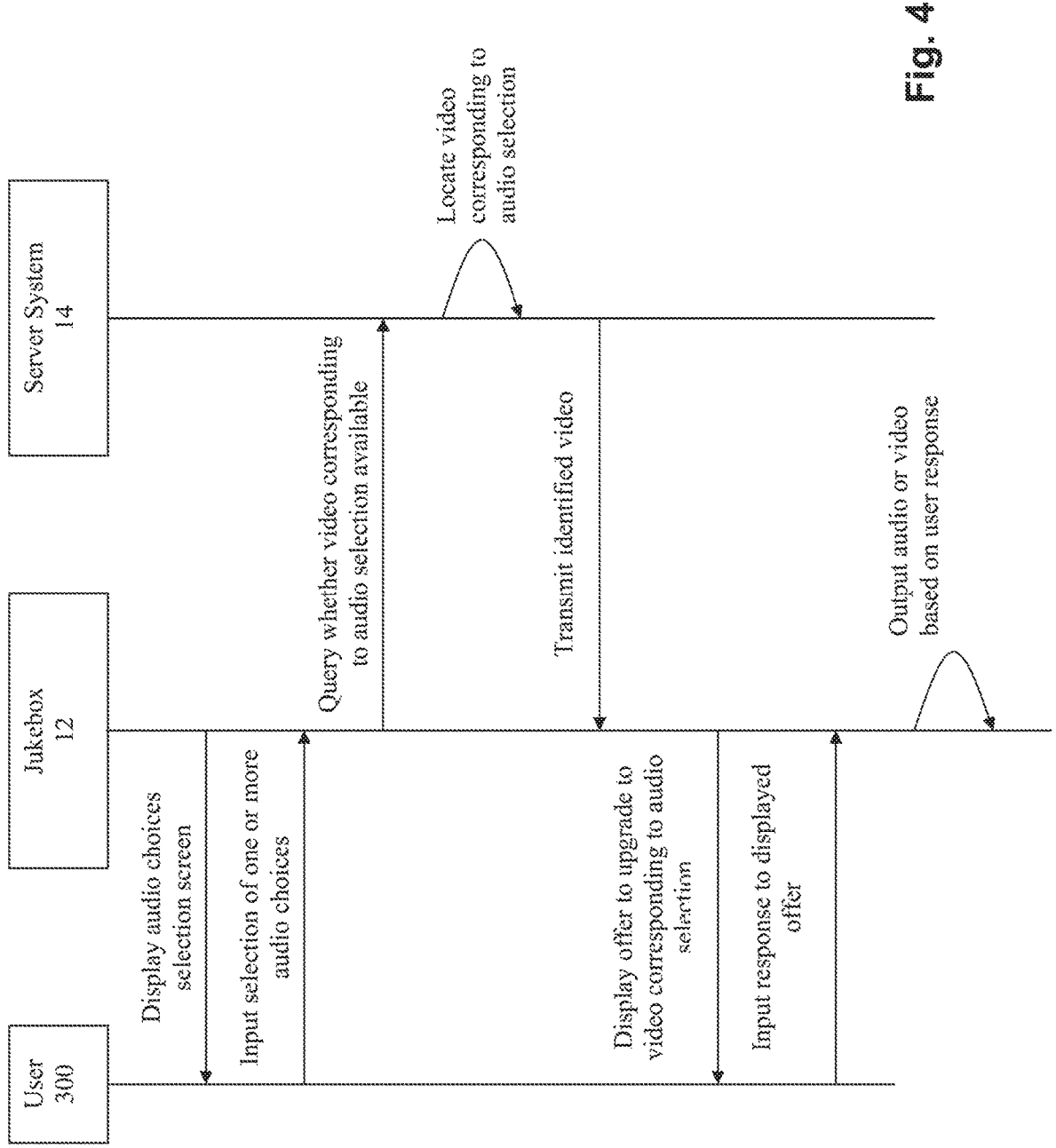
FIG. 4 is a sequence diagram of interactions between a user, a jukebox, and a server system for offering a video file corresponding to a selected audio file in accordance with preferred embodiments of the present invention.

Referring to FIG. 4, in the case where a video corresponding to a selected audio is not found locally, or if video data sets are not stored in the jukebox 12, the controller U1 may query the remote server 14 for a corresponding video. The jukebox 12 transmits information relating to the selected audio to the server 14. Preferably, the transmitted information is the audio data set metadata. The server 14 attempts to locate video corresponding to the audio selection in the video catalog 18 based on the received metadata, for example, based on the cross-referencing of the audio and video metadata. If the server 14 is unable to locate the corresponding video, the server 14 optionally queries one or more other servers of third parties (not shown) to identify the corresponding video. Such servers of third parties may be servers managed by record labels, or the like. In this way, the server 14 has access to a vast number of video data sets that is orders of magnitude larger than what may be stored locally by the jukebox 14. If a corresponding video data set to the selected audio is located by the server 14, the video is transmitted (e.g., downloaded or streamed) from the server 14 to the jukebox 12. Thereafter, the jukebox presents an offer to play the corresponding video to the user 300, in the same manner as described with reference to FIG. 3.

Figure 5:
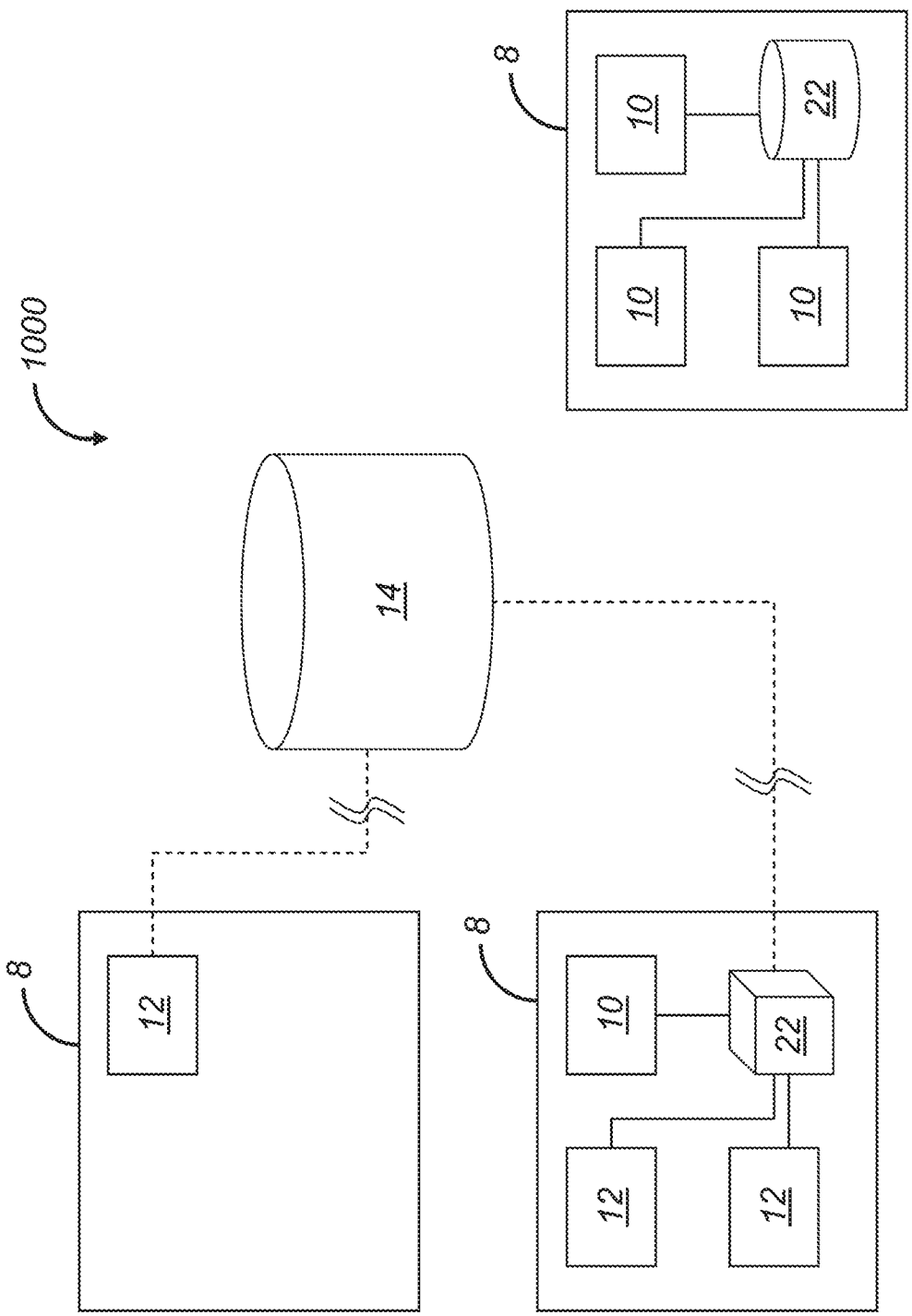
FIG. 5A is a schematic diagram of an amusement system including one or more amusement devices and one or more jukeboxes.
FIG. 5B is a schematic diagram of an amusement system including a venue controller for controlling one or more electronic devices.

FIG. 5A illustrates schematically various embodiments of implementing an amusement system 1000 including one or more electronic devices 10. Electronic devices 10 preferably include display devices such as televisions, projectors, electronic amusement devices, and the like. A venue location 8 may, for example, house one or more electronic devices 10 that may each be individually in communication with the server 14. The server 14 is typically geographically remote from the electronic devices 10 and the jukeboxes 12.

The venue location 8 may also have a venue controller 22, enabling the communication between all of the electronic devices 10 and the jukebox(es) 12 housed therein with the central server 14. The venue controller 22 preferably serves as a central location for synchronizing, and otherwise controlling, the operation of the electronic devices 10 and the jukeboxes (12). In another alternative arrangement, as shown in FIG. 8B, the venue location 8 may house its own venue controller 22, which performs all of the functions listed above with respect to the central server 14.

The electronic devices 10 may be connected to their corresponding servers 14, 22 through conventional communication configurations, such as a LAN, WAN, or the like. In one preferred embodiment, an amusement device 10 may connect to the central server 14 via the Internet.

As shown in FIG. 5A, certain venue locations 8 do not have a jukebox 12 deployed thereat. In this case, the venue controller 22 is preferably configured to serve as an audio and/or video player instead of the jukebox 12. Preferably, users 300 interact either directly or indirectly with the venue controller 22 to select content to be played by the venue controller 22 at the venue 8. Preferably, the venue 8 enters into a subscription-based agreement with an operator of the server 14 to allow media files to be played by the venue controller 22 at the venue 8. In one embodiment, the subscription-based agreement allows the venue controller 22 to play an unlimited number of audio and/or video data sets at the venue 8 at the direction of venue patrons interacting with the server 14 using their mobile devices 600. In other embodiments, the subscription-based agreement is on a charge-per-play model wherein the venue is periodically billed for plays occurring at the venue location 8 during a pre-determined time period.

Users 300 select audio and/or video content to be played by the venue controller 22 at the venue 8 using their respective mobile devices 600. Preferably, the service provider associated with the server 14 provides a mobile application executable by the mobile devices 600 displaying a graphical user interface for selecting and playing the desired audio and/or video data sets. In such a case, the user 300 may be billed for playing audio and/or video selections through an account established with the service provider associated with the server 14. Therefore, the cost of playing the audio and/or video through the venue controller 22 can be shifted from the venue 8 to the users 300.

Figure 6:
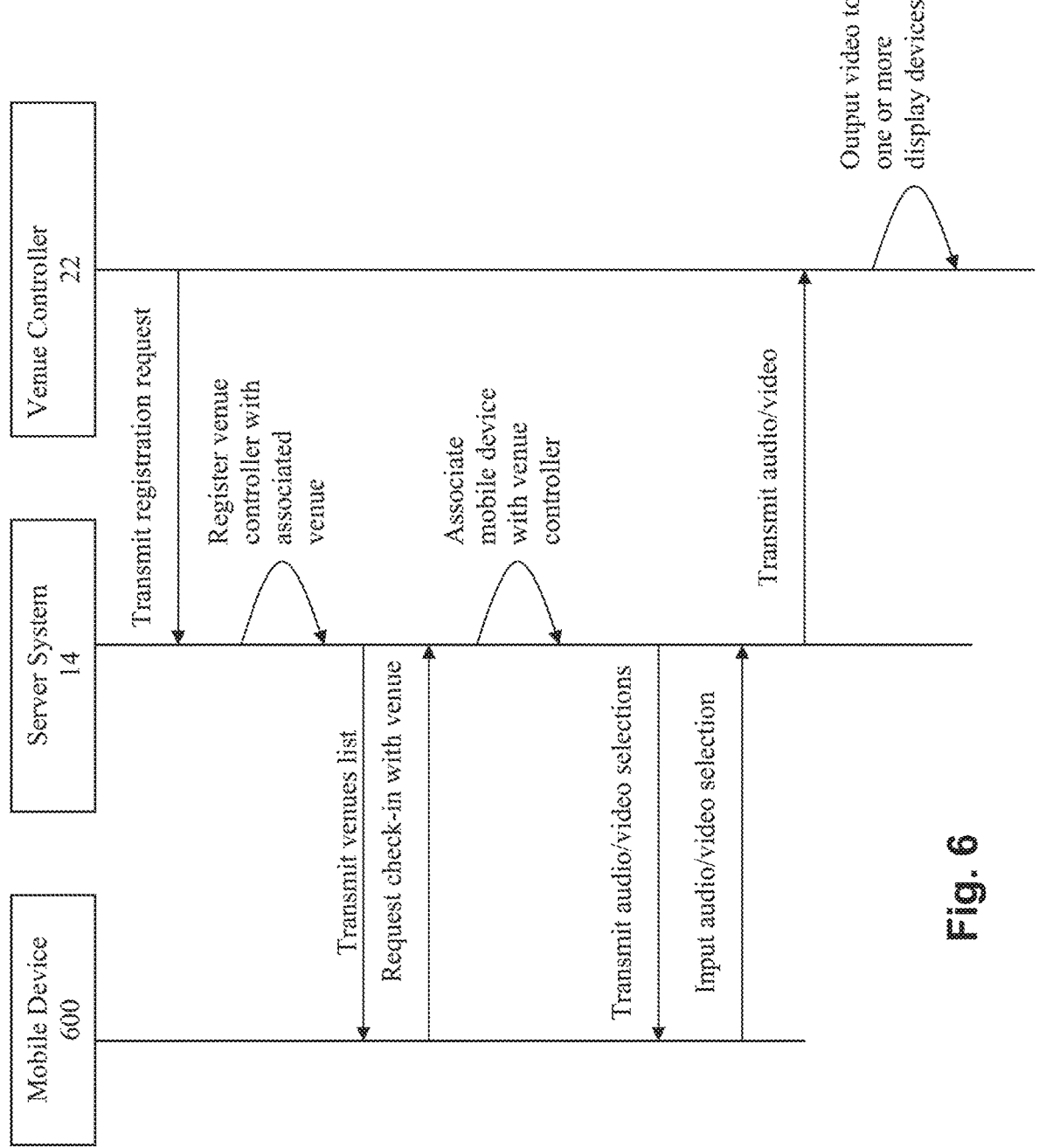
FIG. 6 is a sequence diagram of interactions in a subscription-based on demand video system in accordance with preferred embodiments of the present invention.

FIG. 6 is a sequence diagram of interactions for playing audio and/or video through the venue controller 22. The venue controller 22 registers with the server 14 by transmitting a registration request. The server 14 registers the venue controller 22 with the venue 8 associated with the venue controller 22. Preferably, the venue 8 is previously subscribed to the media services provided by the server 14, or is subscribed as a result of the registration request by the venue controller 22.

The server 14 communicates with mobile devices 600 of users 300 to allow the users 300 to check into venue locations 8 at which they are preferably physically present. A user 300 checks into a desired venue by selecting the venue from a list of geographically proximate venues that is transmitted to the mobile device 600 from the server 14 based on a geographic location of the mobile device 600. Once the user 300 has selected a venue location 8 to check in at, the server 14 associates the user 300 with the venue 8. The server 14 identifies audio and/or video content available for selection by the checked in user 300 to be played at the checked in venue 8 through the venue controller 22. The server 14 retrieves and transmits the selected audio and/or video to the venue controller 22.

The venue controller 22 preferably includes a processor, one or more memories (not shown), and a network interface for communicating over a network with the server 14. Upon receiving the audio and/or video over its network interface, the venue controller 22 preferably stores the received audio and/or video in its memory, and the processor causes the received audio and/or video to be output to a sound system and/or one or more display devices deployed at the venue location 8. Thus, the venue controller 22 acts as a replacement for the jukebox 12. In this way, the venue controller 22 may be viewed as the jukebox 12 without any human input/output components such as the display 20 and the input component 24, and the mobile devices of the users 300 may be viewed as the display 20 and the input component 24 of the jukebox 12. In this way, venues 8 can achieve substantial savings by foregoing acquiring the jukebox 24, and yet achieving many of its benefits.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A system for playing audio data sets at a venue that are selected by mobile devices associated with the venue, the system comprising:
   (a) an audio catalog storing a plurality of audio data sets available for playing at the venue, the audio catalog being remotely located from the venue; and
   (b) a server system in electronic communication with the audio catalog and remotely located from the venue configured to:
      (i) transmit, over a first network, to mobile devices of users a list of venues that are geographically proximate to the geographic location of the respective mobile devices;
      (ii) receive, over the first network, association requests from the mobile devices of users, the association requests being selected from the list of venues by respective users of the mobile devices via the mobile devices, thereby associating the respective mobile devices with the selected venue, the venue having one or more venue controllers communicatively coupled to the server system by a second network, the mobile devices being remotely located from the server system;
      (iii) transmit, over the first network, a listing of the plurality of audio data sets that are available for playing at the venue to the associated mobile devices;
      (iv) receive, over the first network, from at least one of the associated mobile devices, selections of one or more of the plurality of audio data sets to be played at the venue; and
      (v) transmit, over the second network, the selected one or more audio data sets from the audio catalog via the server system to a respective network interface of at least one of the one or more venue controllers, the one or more venue controllers causing the transmitted one or more audio data sets to be played on one or more audio output devices deployed at the venue, wherein the one or more venue controllers do not include an input separate from the respective network interface for receiving selections to be played at the venue.

2. The system of claim 1, wherein the first network and the second network are different networks.

3. The system of claim 2, wherein at least one of the first network and the second network is the Internet.

4. The system of claim 1, wherein the at least one venue controller is registered with the server system.

5. The system of claim 4, wherein the server system implements a subscription-based service such that the users are not charged for the selections.

6. The system of claim 1, wherein each of the plurality of audio data sets includes music.

7. The system of claim 1, wherein the one or more audio output devices deployed at the venue are audio output devices of the mobile devices.

8. The system of claim 1, wherein the one or more audio output devices deployed at the venue is a sound system at the venue.

9. The system of claim 1 wherein the users are physically present at the venue with their mobile devices.

* * * * *